United States Patent
Cao et al.

(10) Patent No.: US 7,470,318 B2
(45) Date of Patent: Dec. 30, 2008

(54) SYNTHETIC MICA BASED PEARLESCENT PIGMENTS CONTAINING FERRITES

(75) Inventors: Paul Cao, Wappingers Falls, NY (US); Carolynn Lavallee, Croton on Hudson, NY (US); Steven Jones, Budd Lake, NJ (US); Debbie Cacace, Cold Spring, NY (US)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 11/781,249

(22) Filed: Jul. 21, 2007

(65) Prior Publication Data

US 2008/0017075 A1    Jan. 24, 2008

Related U.S. Application Data

(60) Provisional application No. 60/829,018, filed on Oct. 11, 2006, provisional application No. 60/820,099, filed on Jul. 21, 2006.

(51) Int. Cl.
*C09C 3/06* (2006.01)
*C09C 3/12* (2006.01)
*C09C 1/24* (2006.01)
*C09C 1/28* (2006.01)
*C09D 5/36* (2006.01)

(52) U.S. Cl. .................. 106/418; 106/417; 428/403; 428/404; 428/405

(58) Field of Classification Search ................. 106/417, 106/418; 428/403, 404, 405
See application file for complete search history.

(56) References Cited

U.S. PATENT DOCUMENTS

| | | | | | |
|---|---|---|---|---|---|
| 3,087,828 | A | * | 4/1963 | Linton | 106/417 |
| 3,087,829 | A | * | 4/1963 | Linton | 106/417 |
| 3,342,617 | A | * | 9/1967 | Jackson | 106/415 |
| 3,926,659 | A | * | 12/1975 | Bernhard et al. | 106/418 |
| 4,565,581 | A | * | 1/1986 | Bernhard | 106/417 |
| 4,828,623 | A | * | 5/1989 | Nitta et al. | 106/450 |
| 5,091,011 | A | * | 2/1992 | DeLuca, Jr. | 106/417 |
| 5,233,034 | A | * | 8/1993 | Toikka | 540/145 |
| 5,273,576 | A | * | 12/1993 | Sullivan et al. | 106/418 |
| 5,344,488 | A | * | 9/1994 | Reynders et al. | 106/425 |
| 5,423,912 | A | * | 6/1995 | Sullivan et al. | 106/417 |
| 5,500,043 | A | * | 3/1996 | Harada et al. | 106/456 |
| 5,741,355 | A | * | 4/1998 | Yamamoto et al. | 106/417 |
| 5,759,255 | A | * | 6/1998 | Venturini et al. | 106/418 |
| 6,139,615 | A | * | 10/2000 | Jones | 106/418 |
| 6,270,563 | B1 | * | 8/2001 | Herget et al. | 106/415 |
| 2005/0142084 | A1 | * | 6/2005 | Ganguly et al. | 424/63 |

FOREIGN PATENT DOCUMENTS

| | | | | |
|---|---|---|---|---|
| JP | 62-16408 | A | * | 1/1987 |
| JP | 05-137995 | A | * | 6/1993 |
| JP | 11-273932 | A | * | 10/1999 |

* cited by examiner

*Primary Examiner*—Anthony J Green
(74) *Attorney, Agent, or Firm*—Bernard Lau; Melanie Brown; Raymond Keller

(57) ABSTRACT

A pearlescent pigment comprises (a) synthetic mica substrate, (b) calcined ferrite coating on the substrate, and (c) an outer layer or treatment wherein said outer layer or treatment was added to the calcined ferrite coated synthetic mica in water.

The pearlescent pigment may be used in exterior applications such as automotive paint systems.

9 Claims, 11 Drawing Sheets

SYNTHETIC MICA BASED PEARLESCENT PIGMENTS CONTAINING FERRITES

This patent application claims priority to U.S. provisional patent application Ser. 60/820,099 filed Jul. 21, 2006 and 60/829,018 filed Oct. 11, 2006 incorporated herein by reference in their entireties.

FIELD

The present invention relates to pearlescent pigments. In particular the present invention relates to metal oxide coated pearlescent pigments having good stability and good luster.

BACKGROUND

Many known pearlescent or nacreous pigments are based on micaeous or other lamellar substrates that have been coated with a metal oxide layer. As a result of reflection and refraction of light, these pigments exhibit a pearl-like luster. Depending on the thickness of the metal oxide layer, they can also exhibit interference color effects. A good description of this type of pigment can be found in U.S. Pat. Nos. 3,087,828 and 3,087,829.

The pearlescent pigments most frequently encountered on a commercial basis are titanium dioxide-coated mica and iron oxide-coated mica pearlescent pigments. It is also well-known that the metal oxide layer may be over-coated. For instance, said U.S. Pat. No. 3,087,828 describes the depositing of $Fe_2O_3$ onto a $TiO_2$ layer while U.S. Pat. No. 3,711,308 describes a pigment in which there is a mixed layer of titanium and iron oxides on the mica that is overcoated with titanium dioxide and/or zirconium dioxide.

The oxide coating is in the form of a thin film deposited on the surfaces of the mica particle. The resulting pigment has the optical properties of thin films and thus the color reflected by the pigment arises from light interference which is dependent on the thickness of the coating. Since iron oxide has an inherent red color, a mica coated with this oxide has both a reflection color and an absorption color, the former from interference, the latter from absorption of light. The reflection colors range from yellow to red and the pigments are generally referred to as "bronze", "copper", "russet", etc. The pigments are used for many purposes such as incorporation in plastics and cosmetics as well as outdoor applications such as automotive paints.

Pearlescent pigments containing ferrites are also known. For example, U.S. Pat. No. 5,344,488 and DE 4120747 describe the deposition of zinc oxide onto mica platelets which had been coated with iron oxide. The U.S. patent states that in order to avoid the disadvantage of conventional zinc oxide/mica pigments, namely the tendency to agglomerate, and to obtain a pigment which had good skin compatibility, anti-bacterial action, favorable optical absorption properties and a surface color, the zinc oxide layer is applied to a previously prepared metal oxide-coated plate-like substrate. When calcined, small needle shaped crystallites are randomly distributed on the surface layer so that the zinc ferrite layer obtained is not entirely continuous. The patent states that unlike substrates covered entirely with zinc oxide in a continuous layer, the substrates covered with a layer containing crystallites show only a slight tendency to agglomerate.

The quality of a pearlescent pigment is generally dependent upon the smoothness or continuousness of the coating on the micaceous substrate. The quality of the pigment decreases rapidly with increasing discontinuities in the coating. Said U.S. Pat. No. 5,344,488 indicates that discontinuity is essential in order to avoid agglomeration. Therefore, quality must be sacrificed in order to obtain a usable pigment.

Nitta, U.S. Pat. No. 4,828,623, discloses a process of increasing the water resistance of a titanium dioxide-coated mica pearlescent pigment, which may or may not be aluminum treated, by coating the base material with a hydrated zirconium oxide formed in the presence of hypophosphite. This pigment may be thereafter treated with a silane coupling agent. However, Nitta points out in a later patent, U.S. Pat. No. 5,223,034, that the pigment so made does not stand up under outdoor weather exposure tests and accelerated weatherability tests. The later patent, therefore, overcoats the earlier product with a hydrated cobalt, magnesium or cerium oxide.

Frequently metal oxide coated substrates are calcined and then further processed in water to add another coating. One example is commonly assigned U.S. Pat. No. 5,759,255 disclosing pearlescent pigment for exterior use where improved humidity resistance and weatherability of a metal oxide-coated mica is achieved by treatment with an aluminum or an aluminum-cerium combined with a hydrolyzed silane coupling agent. These overcoats are applied by dispersing metal oxide coated mica substrates in an aqueous system.

We have discovered that calcined ferrite or iron oxide coated natural mica as disclosed in our U.S. Pat. No. 6,139,615 is not stable in aqueous systems and as a result, the natural mica delaminates and/or the ferrite or iron oxide coating separates from the natural mica during the coating process.

FIGS. 4-5 show iron oxide coated natural mica that was calcined at 850° C. for 20 minutes without any outer layer treatment. FIG. 4 is at 20,000× magnification and the sample shows cracks and the iron oxide coating peeling off of the natural mica. FIG. 5 is at 60,000× magnification and the sample shows a bumpy iron oxide coating.

Topy U.S. Pat. No. 5,741,355 teaches that iron oxide may be coated onto synthetic mica. Sun Chemical's SunShine products comprise synthetic fluorophlogopite coated with $TiO_2$ and optionally $Fe_2O_3$, carmine, or iron blue. Most grades are available with particle size distributions of 9-45, 20-95, 40-250, and 95-730 microns. Sun Chemical's SunShine Crystal product comprises synthetic mica coated with $TiO_2$ and/or $Fe_2O_3$. These pigments have a particle size distribution of 25-150 microns. Sun Chemical US Patent Application Publication 2005/0142084 discloses cosmetics containing nacreous pigments made of coated synthetic mica wherein the particle size is 150-1,000 microns.

DuPont U.S. Pat. No. 3,087,828 has an example wherein a synthetic phlogopite substrate is coated with titanium dioxide. No calcination step is mentioned.

Li Teiqing et al., "Preparation of Synthetic Mica Pearly Luster Pigment", Journal of Synthetic Crystals, Volume 19, No. 2, pages 166-171 (May 1990) teaches fluorophlogopite coated with titanium dioxide.

It is desired to provide a pigment having improved water stability prior to treatment with an outer layer for providing improved humidity resistance and weatherability and the like.

SUMMARY

We have discovered a solution to the foregoing problem by developing pearlescent pigment that can be reslurried in water. The pigment has a platy synthetic substrate such as synthetic mica. The substrate is coated with at least a ferrite or iron oxide layer and an outer layer to provide for example, weatherability and humidity resistance. The calcined ferrite coated synthetic substrate has better water stability than cal-

DETAILED DESCRIPTION

Figure 1:
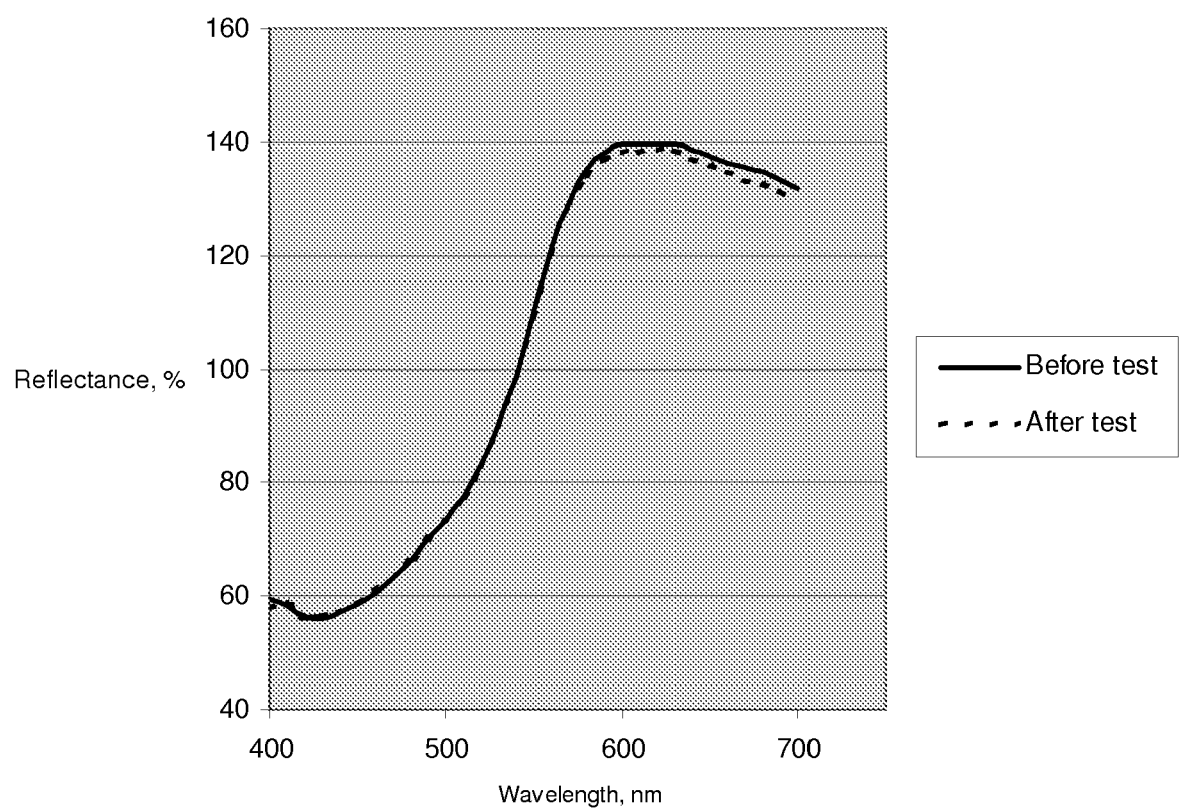
FIG. 1 is a graph displaying the results of a stability test conducted on a synthetic mica based pigment.

Synthetic Mica: In accordance with the present invention, a pearlescent pigment is provided having a platy substrate. The platy substrate is a non-delaminating substrate such as a synthetic mica. The substrate is coated with at least a ferrite- or iron-oxide/hydroxide layer and the pigment is provided with an outer layer applied in an aqueous system to provide the pigment with some form of environmental stability. The use of synthetic substrates in the present pigment provides improved water stability. The pigment is especially useful with respect to exterior treatments applied in an aqueous system.

As mentioned above, the platy substrate employed herein is synthetic mica.

It is preferred that the synthetic mica be fluorophlogopite.

In an embodiment, the fluorophlogopite is obtained commercially from Shantou F. T. Z. Sanbao Pearl Luster Mica Tech Co., Ltd., (Guangdong, China). The fluorophlogopite, $KMg_3AlSi_3O_{10}F_2$, is a wet process fluorophlogopite mica powder made using a wet method process. The Sanbao fluorophlogopite has an average thickness of 0.4 to 1.3 microns as determined by SEM measurement. Such wet process is described in Chinese patent publication CN 1693200A. Chinese patent publication CN 1693199A, is a related patent disclosing a method for precisely classifying mica powder synthesized by a wet method. Both patents are assigned to Sanbaoguangjing Mica Sci. & Tec. and are incorporated herein by reference.

The wet process refers to a production method that uses water as the medium in a number of steps. First, the mica powder is passed through a high pressure water pump to carry out hydraulic breaking, then a centrifuge for dewatering, followed by a roller mill for grinding and pulping. After the mica passes through the roller mill, the mica is fed into a classifying pool and finally into a drying stove or oven to be baked until moisture content of the mica is less than 1%. The fluorophlogopite produced possesses positive characteristics of synthetic mica such as brightness, non-corrodibility and the absence of deleterious substances, e.g. Hg, Pb, As, etc. Other distinct quality characteristics include high purity, high chromaticity (98.7%), low Fe content (<0.2%) and smooth surface (the average roughness concentration is <10 nm).

Metal Oxides: The synthetic substrate is coated with a ferrite or iron oxide/hydroxide with or without tin oxide/hydroxide. A ferrite is a double oxide of iron oxide and another metal oxide such as zinc oxide. Ferrites generally conform to the formula $MFe_2O_4$ in which M is one or a mixture of metals which can exist in a divalent state such as calcium, strontium, barium, zinc, cadmium, manganese, magnesium, cobalt, nickel, copper and the like. The pearlescent pigment of this invention is made by combining a source of the metal M with an iron compound and the platy substrate, such as fluorophlogopite, causing both the iron and metal M to deposit on the substrate and then co-calcining the iron and metal M. Deposition of the hydrous iron compound can be done either before (preferably), while or after the metal source is added.

The preparation of iron oxide-coated synthetic micaceous pearlescent pigments is akin to the process of coating natural pearlescent pigments which is well-known in the art and the process need not be described in any detail here. In broad terms, an iron source is combined with the synthetic mica substrate to form a slurry, usually aqueous, and the reaction conditions are adjusted such that a hydrous iron compound is deposited on the synthetic mica substrate, followed by hydrolysis. Adjusting the pH of the system into a basic value is usually accomplished by adding a base to the mixture. Typically bases include sodium hydroxide and potassium hydroxide. This process can also be carried out, if desired, in the vapor phase. In one embodiment of the present invention, a $SiO_2$ and/or a $SnO_2$ can be deposited between the iron coating and the substrate and may be a continuous or discontinuous coating or layer. Such an $SnO_2$ addition may be at a thickness of less than 20 nm resulting in an optically inactive layer or coating. Regardless of the $SnO_2$ thickness, the additive may function as an adhesive or layer smoother.

At any time prior to the calcining of the iron oxide-coated synthetic mica, a source of a metal M can be combined with the reactants to form a ferrite. Any source of the metal can be used as long as it does not interfere with the formation of the ferrite coating or cause the formation of crystallites. Thus, metal oxides, metal salts such as the chloride or sulfate and the like or even metal complexes can be employed. In those instances where the synthetic mica is present in aqueous slurry form, the metal salt is preferably one which is soluble in water. The metal source is usually added and the metal deposited on the substrate after the hydrous iron compound has already been deposited. However, if desired, the metal can be added before the hydrous iron compound is caused to deposit on the synthetic mica substrate or $SiO_2$ and/or a $SnO_2$ coated synthetic substrate. After the iron and metal have been deposited, the coated substrate is washed and/or calcined in a conventional fashion. The purpose of calcination is to form and densify the ferrite layer. Typical calcination time is one hour. Calcination may take place up to about 1000° C. Each of the layers of the present invention are coated over the substrate in distinct layers or each layer can encapsulate the preceding layers or the substrate.

Aqueous Processing: The present calcined ferrite coated synthetic mica pigment is then added to water or slurried into water for further processing. Examples of further processing include application of an exterior weather coating, a colorant layer, surface modification (such as hydrophobic treatment), cyclo-treatment for powder coating, and Amihope treatment for cosmetic applications.

The pigment of the present invention undergoes post-treatment with the depositing of an outer layer on the pigment. The outer layer can be deposited as a layer contiguous with a preceding layer or can be provided as an encapsulating layer around the pigment. The outer layer provides improved humidity resistance and weatherability in particular when using a synthetic mica substrate. Commonly assigned U.S. Pat. No. 5,759,255 describes these outer coating agents and is herein incorporated by reference in its entirety. For example, useful coating agents suitable for imparting weathering stability include silane coupling agents such as aminosilanes, alkoxysilanes and aminoalkoxysilanes, as well as silane coupling agents combined with a metal oxide such as an aluminum oxide or an aluminum-cerium oxide and any other metal oxide/hydroxide.

The coating of a metal oxide-coated mica pigment with a hydrous aluminum oxide per se is known in the art and is used herein in coating the metal oxide-coated synthetic mica substrate of the present invention. The process is described, for example, in U.S. Pat. No. 5,091,011, the disclosure of which is incorporated herein by reference. Briefly, the pigment is dispersed by stirring in water and then an aluminum compound such as aluminum chloride, aluminum sulfate or aluminum potassium sulfate, and a neutralizing agent such as sodium hydroxide, potassium hydroxide, ammonia or urea, are added simultaneously as aqueous solutions. The resulting hydrolysis causes the hydrous oxide to deposit on the substrate. As described, the aluminum compound must be added slowly enough to permit the formation of a smooth, continuous layer on the platelets and the rate should fall within the range of about 0.03 to 0.1 mg Al per minute per gram of pigment, preferably about 0.005 to 0.07 mg Al/min/g pigment. A quantity of aluminum compound solution is used so as to produce a hydrous aluminum oxide coating containing about 0.05 to 1.2% aluminum, preferably about 0.1 to 0.8% aluminum, based on the total weight of the pigment. Pigments in which the concentration of aluminum is above 1.2% are less effective in stabilization than lower concentrations. After deposition of the coating, the product can be filtered, washed with water and dried at any convenient temperature. Use of a temperature which is high enough to calcine the hydrous aluminum oxide should be avoided.

The coating of the iron oxide-coated mica pearlescent pigment with a coating of a combination of hydrated cerium and aluminum oxides is also per se known. It is described, for instance, in commonly assigned U.S. Pat. No. 5,423,912, the disclosure of which is incorporated herein by reference. Briefly, the pearlescent pigment is dispersed in a liquid from which the cerium and aluminum can be readily precipitated onto the surface of the pigment. This conveniently, and preferably, is an aqueous dispersion. The solid pigment in the dispersion generally comprises about 5 to 30%, preferably about 10 to 20%, and the cerium and aluminum are each added to the dispersion in the form of a salt which is soluble in a liquid medium. While other salts can be used, the nitrate salts are preferred. It is also preferred to deposit about 0.1-1.5% cerium hydroxide, more preferably 0.2-0.6%, calculated as weight percent cerium and about 0.1-1%, more preferably 0.2-0.6%, aluminum hydroxide, calculated as weight percent aluminum, based on the weight of the pigment. The salts can be added to the slurry individually in either order and precipitated or preferably, added simultaneously and precipitated. Precipitation is controlled by raising the pH to a value greater than about 5, preferably to a value of about 5.5-7.5. After completion of the precipitation step, the treated pearlescent product is separated from the dispersion by any convenient means such as, for instance, filtration, centrifugation or settling, washed and dried.

The aluminum- or aluminum-cerium-treated metal oxide-coated mica pearlescent pigment is additionally treated with a hydrolyzed silane coupling agent or a mixture of such agents. These, as known, are compounds which act as an interface between an organic material and an inorganic material to enhance the affinity between the two. Thus, the silane coupling agents generally have both an organo functional group and a silicon functional group bonded either directly or indirectly to silicon. The silicon functional groups are generally alkoxy groups and preferably $C_{1-4}$ alkoxy groups such as dimethoxy, diethoxy, trimethoxy, and triethoxy. Examples of useful organo functional groups are aminopropyl, glycidoxypropyl, methacryloxypropyl, isocyanatopropyl, and vinyl.

Examples of silane coupling agents which can be used in the present invention are gamma-(2-aminoethyl) aminopropyl trimethoxy silane, aminopropyl trimethoxy silane, gamma-aminopropyl triethoxy silane, gamma-(2-aminoethyl)aminopropyl methyl dimethoxy silane, gamma-methacyryloxypropyl methyl trimethoxy silane, gamma-methacyryloxypropyl trimethoxy silane, gamma-glycidoxypropyl trimethoxy silane, gamma-mercaptopropyl trimethoxy silane, vinyltriacetoxysilane, gamma-chloropropyl trimethoxy silane, vinyltrimethoxy silane, octadecyldimethyl-[3-(trimethoxysilyl)-propyl] ammonium chloride, gamma-mercaptopropyl-methyl-dimethoxy silane, methyltrichloro silane, dimethyl-dichlorosilane, trimethylchlorosilane, gamma-isocyanatopropyl triethoxy silane and the like.

The silane coupling agent should be selected so that it is suitable for any organic material in the coating vehicle which will be combined with the pigment in use. When the organic material is a polyester, the organo functional group preferably comprises a methacryl group. When it is a urethane, an amino functional coupling agent is preferred. For acrylic vehicles, the aminoethyl, aminopropyl, methacryloxypropyl, and glycidaloxypropyl trimethoxy silanes are suitable. More recent results indicate that best results occur with combination of amino & non-amino coupling agents.

The pigment is treated with the silane coupling agent by dry or wet mixing. For instance, an aqueous solution of the agent in water or a mixture of water and an organic solvent can be added to an aqueous slurry of the pearlescent pigment. The silane is preferably prehydrolyzed such as, for instance, by stirring the coupling agent in water for a suitable period of time. It is also possible to effect hydrolyzation at the time of mixing. In general, about 0.1 to 10 wt %, preferably about 0.25 to 5 wt %, of the silane coupling agent is used based on 100 parts by weight of pigment being treated. The coupling agent and pigment are combined for a period of time sufficient to allow reaction to occur, which may last from a few minutes to several hours or more, preferably about 3 to 24 hours. Thereafter the treated pigment can be recovered in the conventional fashion such as by filtration, centrifugation and the like, and dried. It is also possible to combine, if desired, the coupling agent treatment with the aluminum/cerium treatment.

Figure 5:
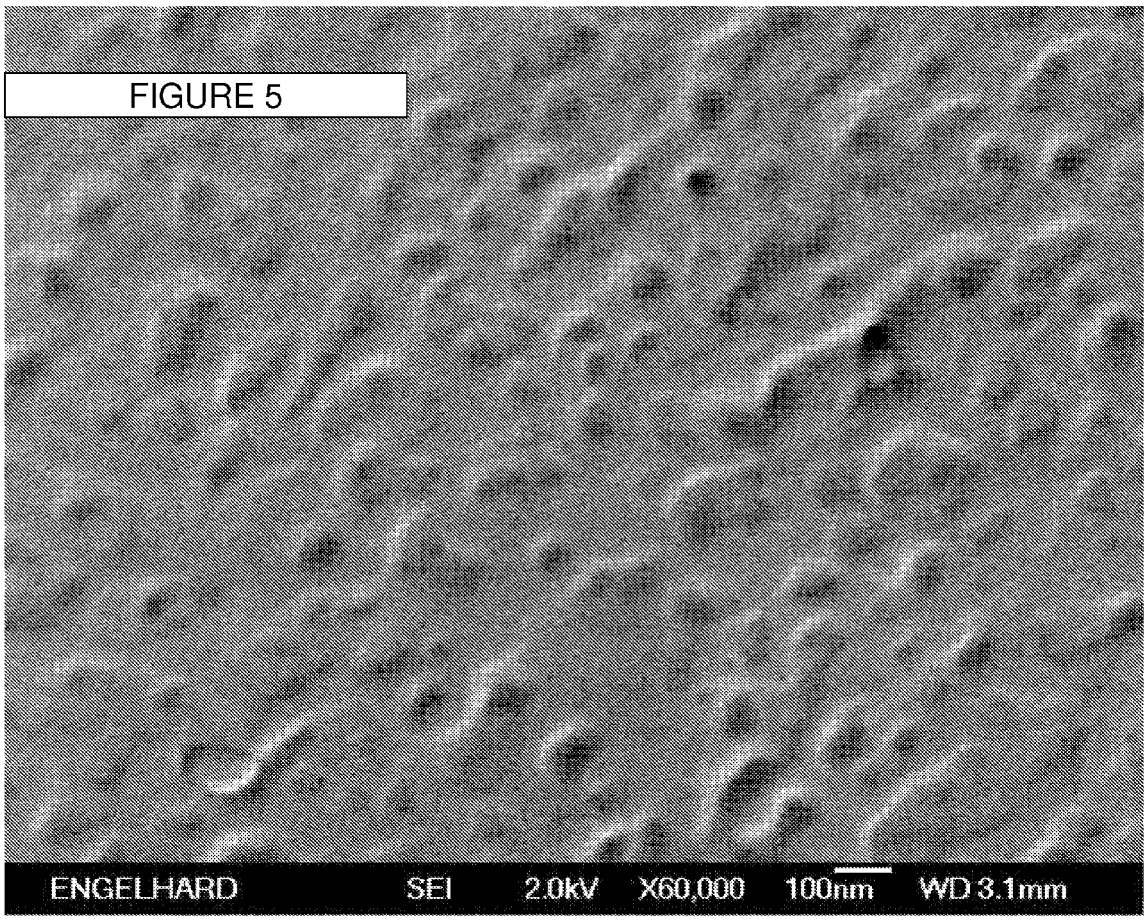
Figure 6:
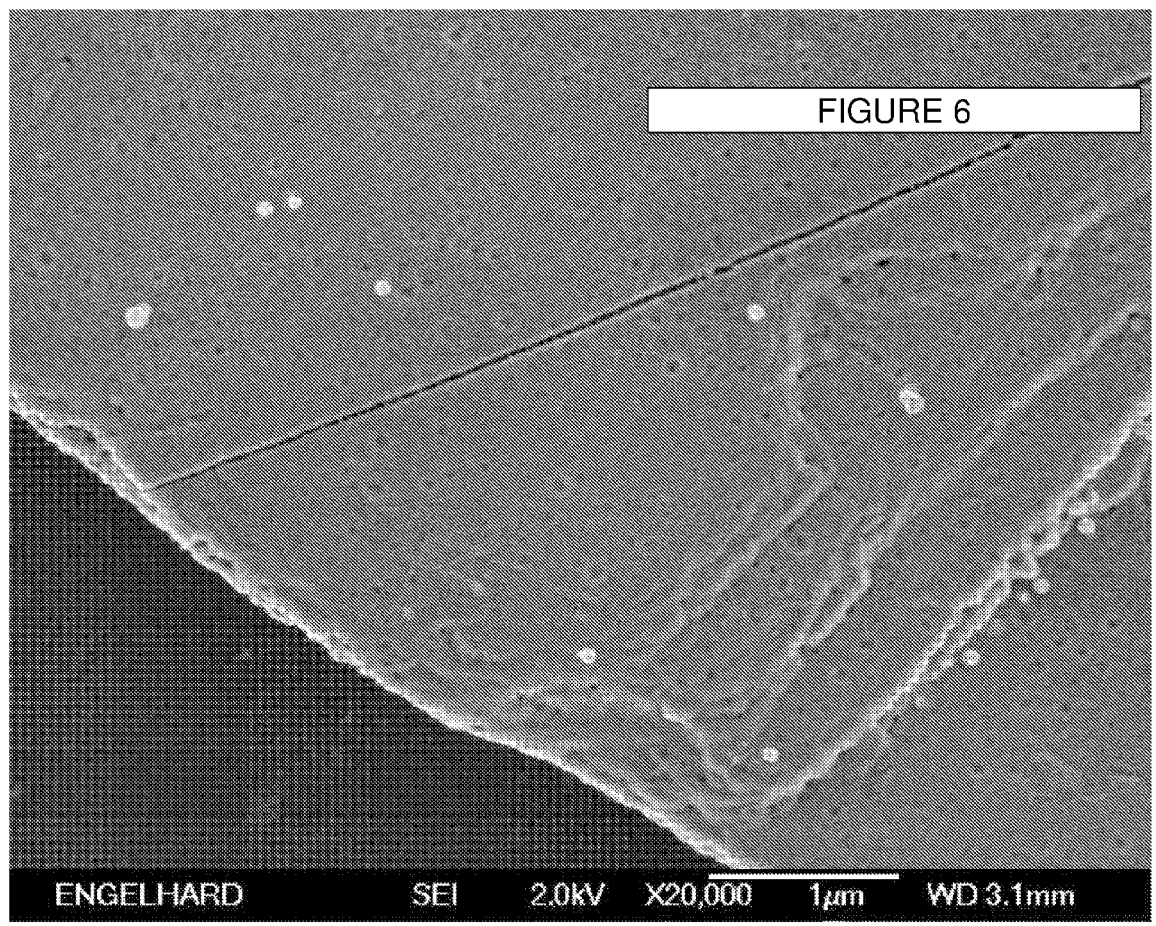
FIGS. 6 and 7 show calcined iron oxide coated synthetic mica.
Figure 7:
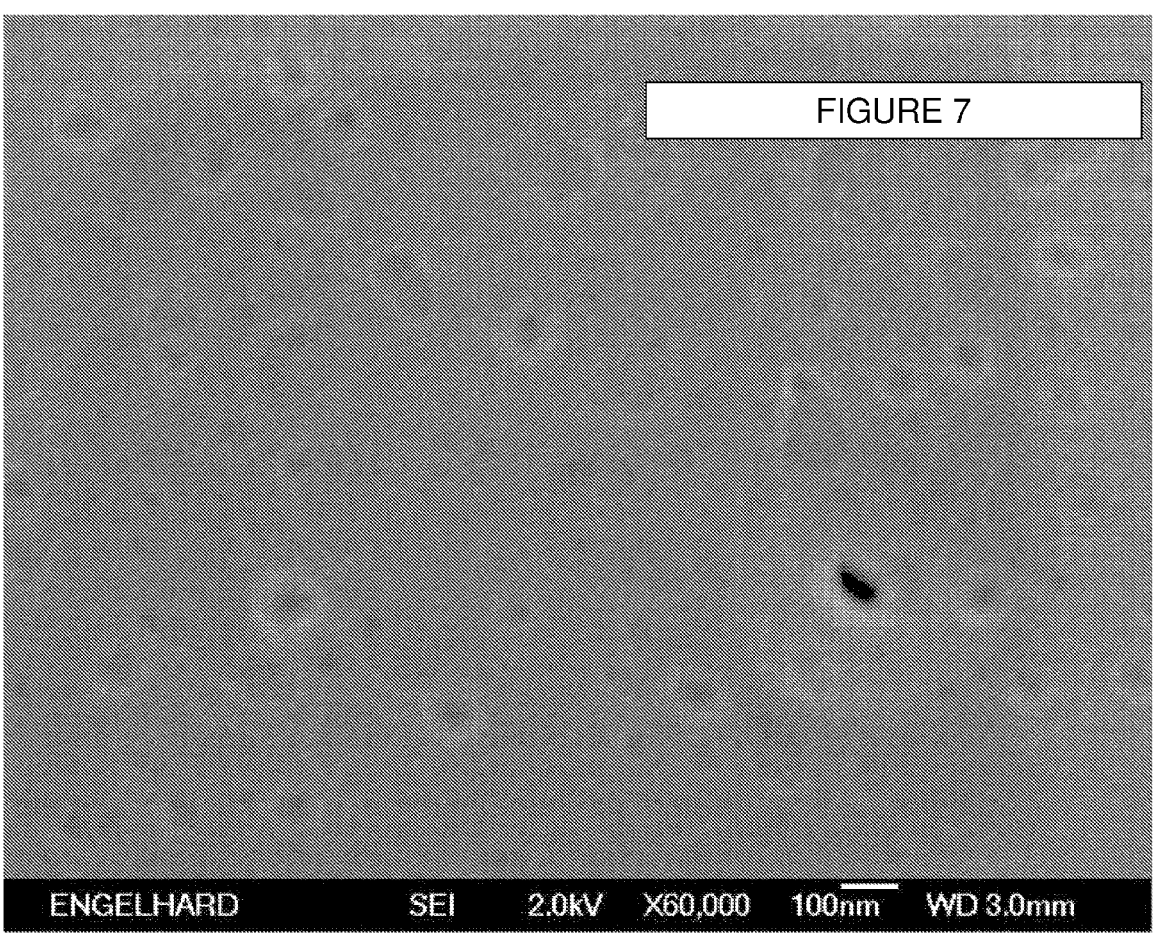

The pigment of the present invention has better quality and stability than natural mica based pigments. The inferiority of the calcined ferrite coated natural mica manifests itself during the application of the outer layer on the calcined ferrite coated natural mica. In post treating the calcined ferrite coated natural mica pigment, the pigment is dispersed in water, which causes mica delamination and/or separation of the coating from the natural mica. The result of the process is irregular coatings and/or cracks in the pigment. Such problems are not present when synthetic mica is used. FIGS. 6-7 show iron oxide coated synthetic mica that was calcined at 850° C. for 20 minutes without any outer layer treatment. FIG. 6 is at 20,000× magnification and the sample shows one long narrow crack and the iron oxide coating is not peeling off of the synthetic mica. FIG. 7 is at 60,000× magnification and the sample shows a smoother iron oxide coating compared with the sample of FIG. 5. The calcined ferrite coated synthetic mica has higher luster than calcined ferrite coated natural mica due to smoother coating and fewer cracks in the synthetic mica.

Figure 8:
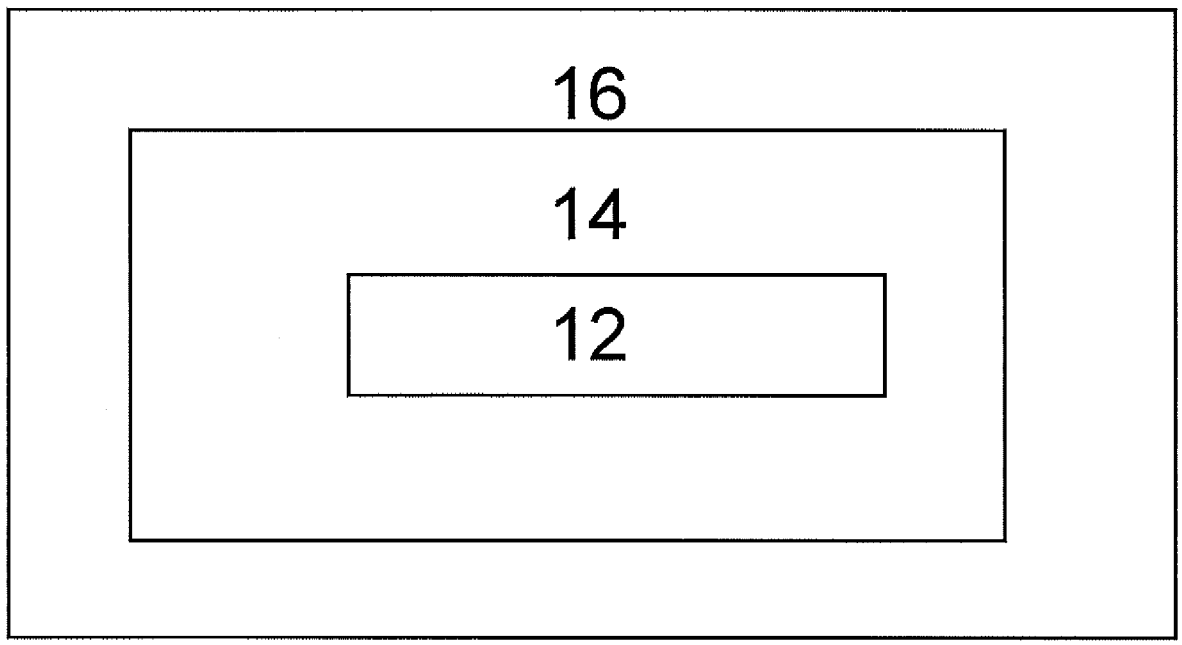
FIGS. 8 through 11 illustrate the present outer coated ferrite coated synthetic mica.
Figure 9:
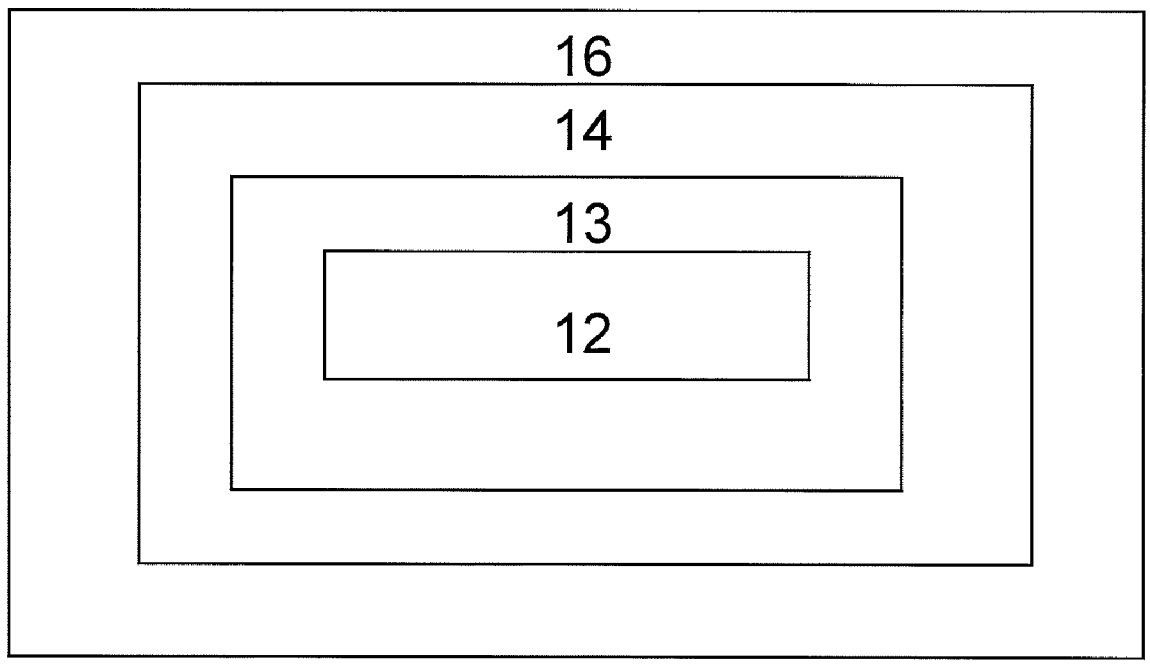
Figure 10:
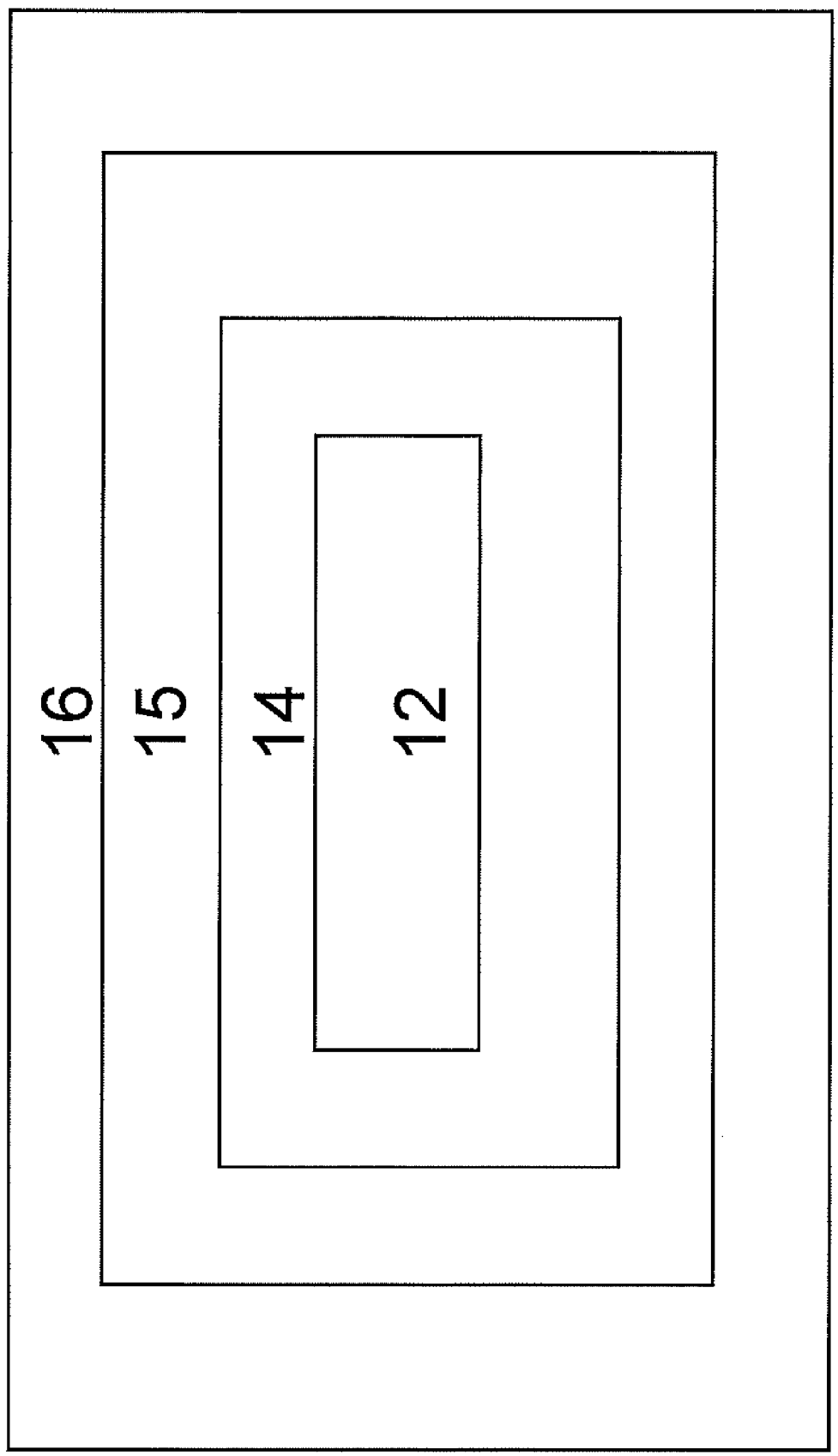
Figure 11:
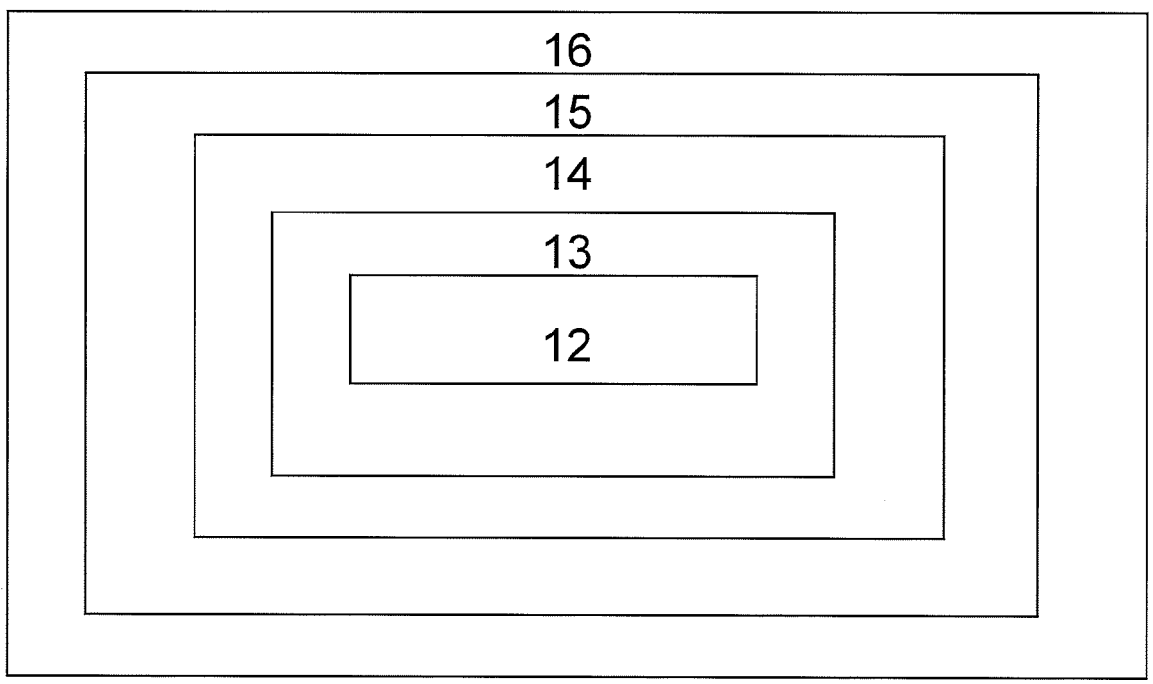

FIG. 8 illustrates one embodiment of the present invention. Synthetic mica substrate 12 has calcined ferrite 14 thereon and an outer treatment 16. FIG. 9 illustrates the presence of optional layer 13 of tin oxide or tin hydroxide or other additives between synthetic mica substrate 12 and calcined ferrite coating 14. FIG. 10 illustrates the presence of optional layer 15 of tin oxide or tin hydroxide or other useful additives between calcined ferrite coating 14 and outer layer 16. FIG. 11 illustrates the presence of both optional layers 13 and 15. Optional layers 13 and 15 may be the same or different mixtures.

Utility: In as much as the pigment with synthetic mica has been found to be environmentally stable, such pigment is particularly useful in exterior applications. For instance, the pigment can be used in coatings including solvent and water borne automotive paint systems. Products of this invention have an unlimited use in all types of automotive and industrial paint applications, especially in the organic color coating and inks field where deep color intensity is required. For example, these pigments can be used in mass tone or as styling agents to spray paint all types of automotive and non-automotive vehicles. Similarly, they can be used on all clay/formica/wood/glass/metal/enamel/ceramic and non-porous or porous surfaces. The pigments can be used in powder coating compositions. They can be incorporated into plastic articles geared for the toy industry or the home. These pigments can be impregnated into fibers to impart new and esthetic coloring to clothes and carpeting. They can be used to improve the look of shoes, rubber and vinyl/marble flooring, vinyl siding, and all other vinyl products. In addition, these colors can be used in all types of modeling hobbies.

The above-mentioned compositions in which the compositions of this invention are useful are well known to those of ordinary skill in the art. Examples include printing inks, nail enamels, lacquers, thermoplastic and thermosetting materials, natural resins and synthetic resins. Some non-limiting examples include polystyrene and its mixed polymers, polyolefins, in particular, polyethylene and polypropylene, polyacrylic compounds, polyvinyl compounds, for example polyvinyl chloride and polyvinyl acetate, polyesters and rubber, and also filaments made of viscose and cellulose ethers, cellulose esters, polyamides, polyurethanes, polyesters, for example polyglycol terephthalates, and polyacrylonitrile.

For a well-rounded introduction to a variety of pigment applications, see Temple C. Patton, editor, The Pigment Handbook, volume II, Applications and Markets, John Wiley and Sons, New York (1973). In addition, see for example, with regard to ink: R. H. Leach, editor, The Printing Ink Manual, Fourth Edition, Van Nostrand Reinhold (International) Co. Ltd., London (1988), particularly pages 282-591; with regard to paints: C. H. Hare, Protective Coatings, Technology Publishing Co., Pittsburgh (1994), particularly pages 63-288. The foregoing references are hereby incorporated by reference herein for their teachings of ink, paint and plastic compositions, formulations and vehicles in which the compositions of this invention may be used including amounts of colorants. For example, the pigment may be used at a level of 10 to 15% in an offset lithographic ink, with the remainder being a vehicle containing gelled and ungelled hydrocarbon resins, alkyd resins, wax compounds and aliphatic solvent. The pigment may also be used, for example, at a level of 1 to 10% in an automotive paint formulation along with other pigments which may include titanium dioxide, acrylic lattices, coalescing agents, water or solvents. The pigment may also be used, for example, at a level of 20 to 30% in a plastic color concentrate in polyethylene.

Test Methods:

Chroma: L*, a*, and b* data are described in Richard S. Hunter, The Measurement of Appearance, John Wiley & Sons, 1987. These CIELab measurements characterize the appearance of the product in terms of its lightness-darkness component, represented by L*, a red-green component represented by a*, and a yellow-blue component represented by b*.

An additional parameter may be derived from the L*, a*, and b* data: the chroma (C) which is $[(a^*)^2+(b^*)^2]^{1/2}$. Chroma refers to the intensity or vividness of the color.

Reflectance: Reflectance is defined as the ratio of incident light on a sample surface to reflected light from the surface. Reflectance is measured using a spectrophotometer as a function of wavelength to produce a reflectance spectrum.

In order to further illustrate the present invention, various examples are set forth below. In these examples, as throughout these specification and claims, all temperatures are degree Centigrade and parts and percentages are by weight unless otherwise indicated.

EXAMPLE 1

To a 3 L flask 160 g of Sanbao F1040 synthetic mica (about 10 to 40 microns) manufactured by Shantou F. T. Z. Sanbao Pearl Luster Mica Tech Co., Ltd., (Guangdong, China) were added to 1 L of water and stirred at room temperature at 320 rpm with a paddle size of 8 cm. Of 420 ml (579 g) of 39% $FeCl_3$ solution, a portion of the 39% $FeCl_3$ solution was pumped into the flask at 0.8 ml/min until a pH of 3.2 (between 3.1 and 3.5) was reached. While maintaining the pH at 3.2 using 35% NaOH, the slurry was heated to 76° C. and the remaining portion of $FeCl_3$ solution was pumped in at 0.8 ml/min. The pH was raised to 9.5 by pumping in 35% NaOH at 1 ml/min. 41 ml (64.3 g) of 62.5% $ZnCl_2$ solution was then added at 1.6 ml/min and the pH was held at 9.5 using 35% NaOH. The run was stopped. The slurry was filtered, washed four times with 200 ml of water and calcined at 825° C. for 1 hour to produce a powder of synthetic mica coated with ferrite which is a double oxide of iron oxide and zinc oxide represented as $ZnFe_2O_4$. With excess amount of iron oxide, it is the mixture of Fe2O3 and $ZnFe_2O_4$ coating on synthetic mica.

4 g of the powder was obtained and separated into two samples to conduct a water slurry test. The first 2 gram sample was added to a beaker with 98 g of water, heated to 80° C., mixed at 200 rpm for 15 minutes, filtered and dried at 120° C., after which it was added to a lacquer (an organic film former in a solvent). The second 2 gram sample was left as is and added to a lacquer. The two samples were then compared to test stability. The results are shown in FIG. 1. The maximum reflectance changed very little between the two samples after the water slurry test showing the synthetic mica based pigment to be stable. Chroma changed from 38.47 to 37.95 (delta C=0.52, very small, essentially no appearance change).

Comparative A

Figure 2:
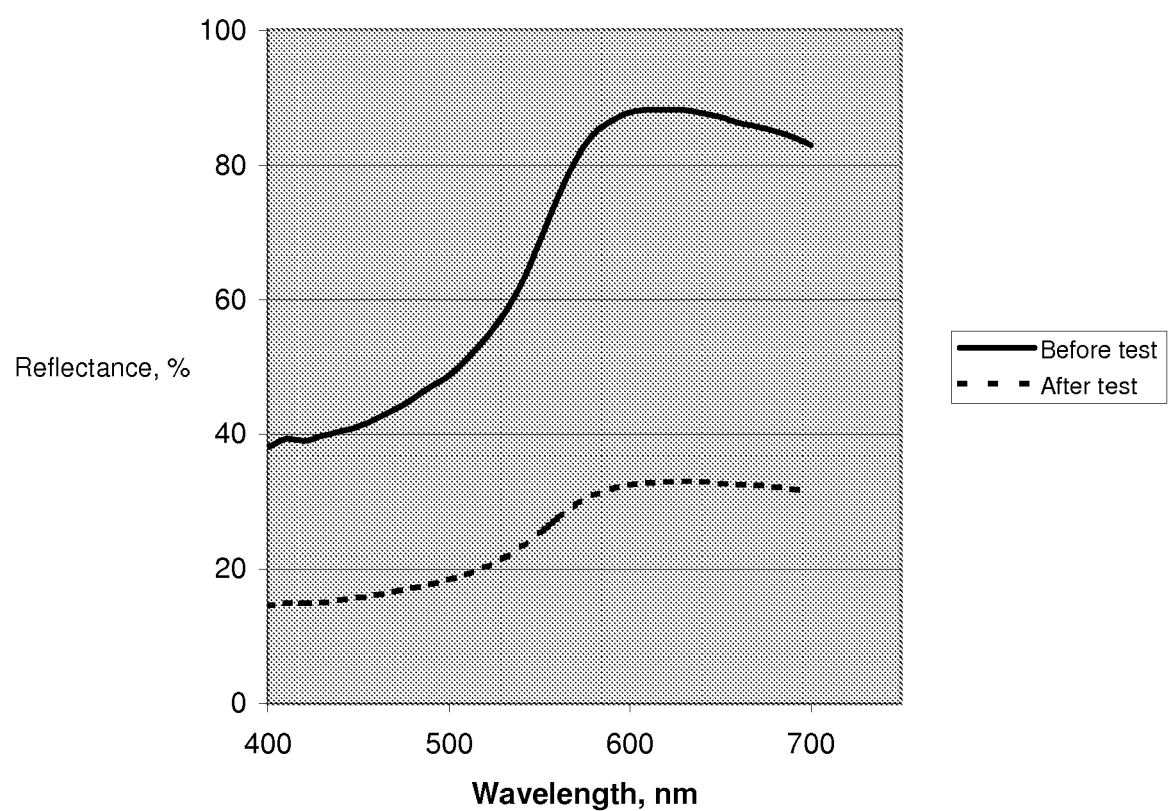
FIG. 2 is a comparative graph showing the results of a stability test conducted on natural mica based pigment.

A comparative sample was made using the procedure of Example 1 by replacing synthetic mica with natural mica. The results are shown in FIG. 2. The maximum reflectance between the two samples changed a great deal during the water slurry test showing the natural mica based pigment to be not stable. Chroma changed from 28.98 to 20.10 (delta C=8.88, very big and obvious appearance change).

Figure 3:
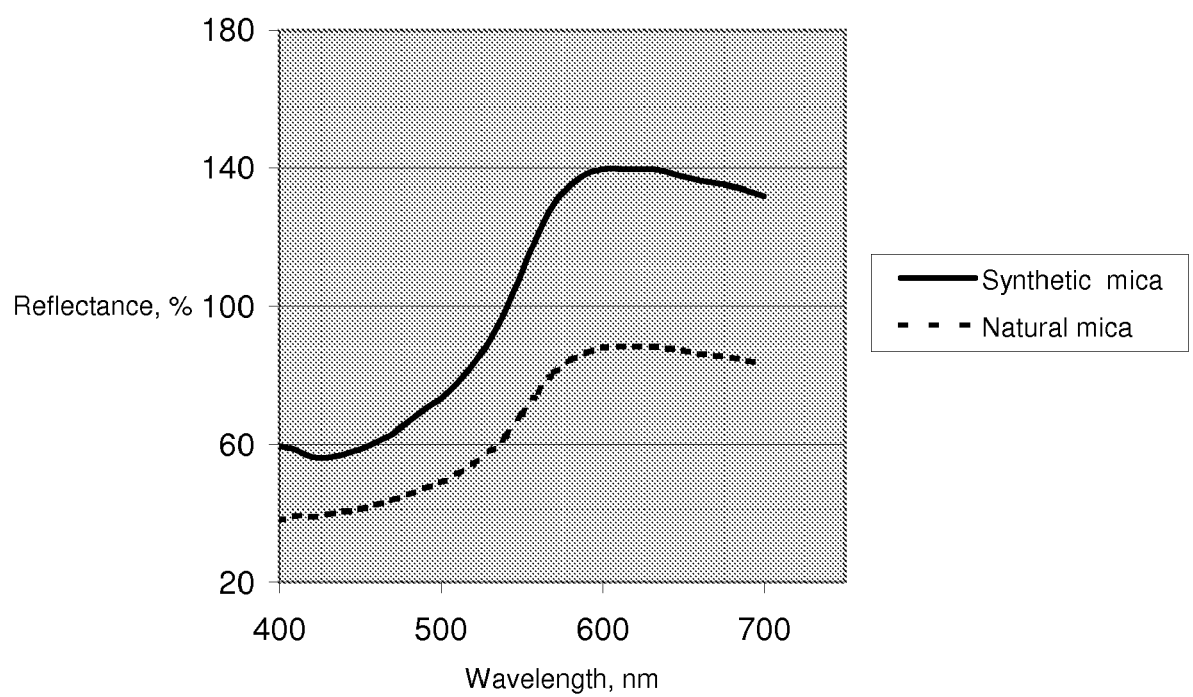
FIG. 3 is a graph comparing quality between synthetic mica based pigment and natural mica based pigment before water stability test.
Figure 4:
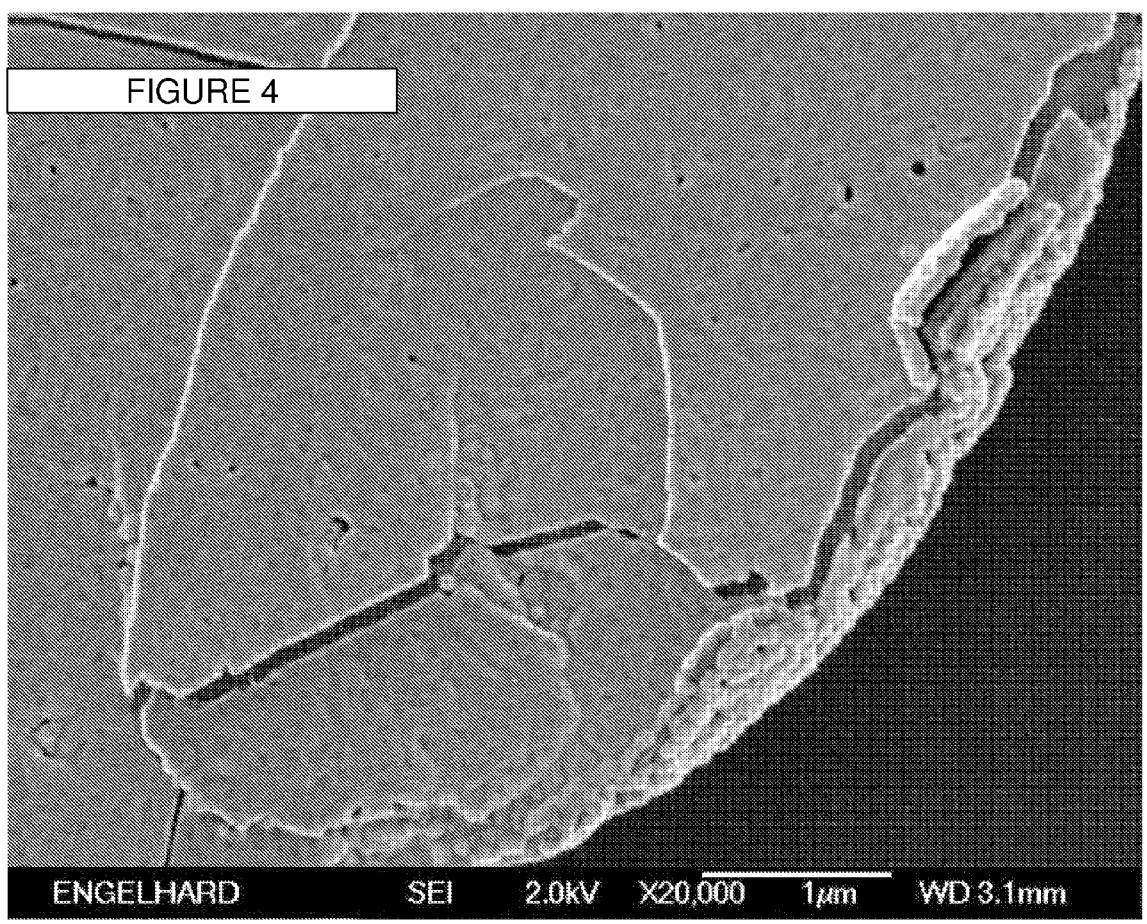
FIGS. 4 and 5 show calcined iron oxide coated natural mica.

FIG. 3 compares the product of Example 1, the synthetic mica-based pigment, with the product of this Comparative A, the natural mica-based pigment. The synthetic mica based pigment is superior in reflectance to natural mica based pigment as shown by the reflectance value.

EXAMPLE 2

The procedure of Example 1 was carried out except that calcination occurred at 900° C. for 1 hour, rather than 825° C. After calcination, 250 g of a calcined synthetic mica coated with ferrite pigment powder was produced. 100 g of the powder were added to 666 ml water in a 2-L flask and stirred at 250 rpm. The slurry was heated to 78° C. and the pH was adjusted to 3.0 with 1:1 HCl. Then 0.75 grams cerium nitrate solution (20% Ce) and 2.5 grams aluminum nitrate solution (4.3% Al) were added and stirred for 15 minutes without having readjusted the pH of 3. Next, the pH was raised to 6.5 by adding 3.5% NaOH at 0.7 ml/min. The solution was stirred for 30 minutes by maintaining the pH at 6.5 after which 1.5 g epoxy silane was added at 0.1 ml/min. The solution was stirred again for 30 minutes without controlling pH. 1.5 g amino silane was added at 0.1 ml/min using new tubing and then stirred for one hour. The solution was filtered, washed four times with 1 L of water and dried at 120° C. for at least 2 hours. A 325-mesh screen was used to de-agglomerate and remove debris. The final product was synthetic mica coated with ferrite and Al, Ce, and silanes. The maximum reflectance changed from 176% to 167%, chroma changed from 49.5 to 48.9 (both reflectance and chroma changes are small).

EXAMPLE 3

The procedure of Example 1 was carried out except that calcination occurred at 900° C. for 1 hour, rather than 825° C. After calcination, 250 g of a calcined pigment powder was produced. 100 g of the powder were added to 666 ml water in a 2-L flask and mixed at 250 rpm. The slurry was heated to 78° C. and the pH was adjusted to 3.0 with 1:1 HCl. Then 0.5 grams cerium nitrate solution (20% Ce) and 1.7 grams aluminum nitrate solution (4.3% Al) were added and stirred for 15 minutes without having readjusted the pH of 3. Next, the pH was raised to 6.5 by adding 3.5% NaOH at 0.7 ml/min. The solution was stirred for 30 minutes by maintaining the pH at 6.5 after which 1.0 g epoxy silane was added at 0.1 ml/min. The solution was stirred again for 30 minutes without controlling pH. 1.0 g amino silane was added at 0.1 ml/min using new tubing and then stirred for one hour. The solution was filtered, washed four times with 1 L of water and dried at 120° C. for at least 2 hours. A 325-mesh screen was used to de-agglomerate and remove debris. The final product was synthetic mica coated with ferrite and Al, Ce, and silanes. The maximum reflectance changed from 172% to 168%, chroma changed from 49.7 to 49.5 (both reflectance and chroma changes are small).

EXAMPLE 4

To a 3 L flask, 160 g of SanbaoF1040 synthetic mica (about 10 to 40 microns in size), manufactured by Shantou F. T. Z. Sanbao Pearl Luster Mica Tech Co., Ltd., (Guangdong, China), was added to 1 L of water and stirred at room temperature at 320 rpm with a paddle size of 8 cm. Of 622 g (450 z) of 39% $FeCl_3$ solution, a portion was pumped into the flask at 0.8 ml/min until a pH of about 3.2 (between 3.1 and 3.5) was reached. The pump was stopped. The solution was heated to 76° C. and then the remaining portion of $FeCl_3$ solution was pumped in at 0.8 ml/min while holding the pH at 3.2 using 35% NaOH. The pH was raised to and held at 9.0 using 35% NaOH at 1 ml/min and a $CuCl_2.2H_2O$ solution (127 g $CuCl_2.2H_2O$ dissolved in 618 g of $H_2O$, at a concentration of 1 Mol/1 kg, 17% by weight) was pumped in at 5.0 ml/min. Generally, enough Cu was added to achieve a Fe:Cu molar ratio of 2 to 1. The run was stopped, the slurry was filtered and washed four times with 200 ml of water, and calcined at 825° C. for 1 hour. The final product was synthetic mica coated with ferrite which is a double oxide of iron oxide and copper oxide represented as $CuFe_2O_4$. The maximum reflectance changed from 119% to 112%, chroma changed from 7.3 to 7.1 (both reflectance and chroma changes are small).

EXAMPLE 5

In a 6 L flask, 2 L H2O was added to 320 g Sanbao F1040 synthetic mica, manufactured by Shantou F. T. Z. Sanbao Pearl Luster Mica Tech Co., Ltd., (Guangdong, China). The slurry was stirred at room temperature at 320 rpm using a paddle size of 10 cm. 1250 g of 39% $FeCl_3$ solution was provided of which a portion was pumped in at 1.6 ml/min until a pH of about 3.2 (between 3.1 and 3.5) was reached. The pump was stopped. The solution was then heated to 76° C. and the remaining portion of the $FeCl_3$ solution was pumped in at 1.6 ml/min while holding the pH at 3.2 using 35% NaOH.

Next, the pH was raised to 9.5 by pumping in 35% NaOH at 2 ml/min. Then 62.5% $ZnCl_2$ solution is supplied at 3.2 ml/min by having maintained the pH at 9.5 using 35% NaOH. The amount of $ZnCl_2$ solution provided is based on the amount of $FeCl_3$ used in the procedure. Generally, enough Zn was added to achieve a Fe: Zn molar ratio of 4.5 to 1. The formula for supplying the 62.5% $ZnCl_2$ solution is:

Amount of $FeCl_3$×0.117 g of 62.5% $ZnCl_2$ solution.

After the $ZnCl_2$ solution was added the run was stopped. The final solution was filtered, washed six times with 1000 ml water and 10 g each were calcined at 700, 825, and 900° C. for 1 hr, respectively.

EXAMPLE 6

Synthetic mica coated with ferrite was coated with silane as follows. A 3 liter flask with an 8 cm paddle was used. A slurry of the synthetic mica coated with ferrite was made in 670 ml of distilled water. The slurry was heated to 78° C. The pH was adjusted to 6.5 with a drop 1:1 HCl. 1.5 grams of epoxy silane (gamma-glycidoxypropyltrimethoxysilane) at 0.15 ml/min was added and the result was stirred 15 minutes. 1.5 grams of amino gamma (gamma-aminopropyltriethoxy silane) at 0.15 ml/min was added and the result was stirred for two hours. The result was filtered and washed 4× with 1 liter water and then dried for two hours at 120° C. The product was screened using a 400 mesh screen. No cerium or aluminum was used.

The product was subjected to accelerated weather testing. The product had a delta E* of 0.5-0.6, good adhesion, and no change in appearance.

What is claimed is:
1. An effect pigment comprising:
   (a) synthetic mica substrate;
   (b) calcined ferrite coating on the substrate; and
   (c) an outer layer or treatment over the calcined ferrite coating wherein said outer layer or treatment was added to said calcined ferrite coated synthetic mica in water.

2. The effect pigment of claim 1 wherein tin oxide is present between said synthetic mica substrate (a) and said calcined ferrite coating (b).

3. The effect pigment of claim 1 wherein tin oxide is present between said calcined ferrite coating and said outer layer (c).

4. The effect pigment of claim 1 wherein said ferrite is $MFe_2O_4$ in which M is one or a mixture of metals selected from the group consisting of calcium, strontium, barium, zinc, cadmium, manganese, magnesium, cobalt, nickel, copper and the like.

5. The effect pigment of claim 1 wherein said ferrite is $MFe_2O_4$ in which M is one or a mixture of metals selected from the group consisting of zinc and copper.

6. The effect pigment of claim 1 wherein said synthetic mica substrate (a) is fluorophlogopite.

7. The effect pigment of claim 1 wherein said outer layer or treatment (c) comprises at least one silane.

8. The effect pigment of claim 1 wherein said outer layer or treatment (c) comprises a mixture of at least two different silanes.

9. Automotive paint comprising:
(a) said effect pigment of claim 1; and
(b) an inorganic or organic solvent.

* * * * *